March 6, 1951 R. P. STOW 2,544,437
SHEEPSKINNING PROCESS
Filed Aug. 4, 1948
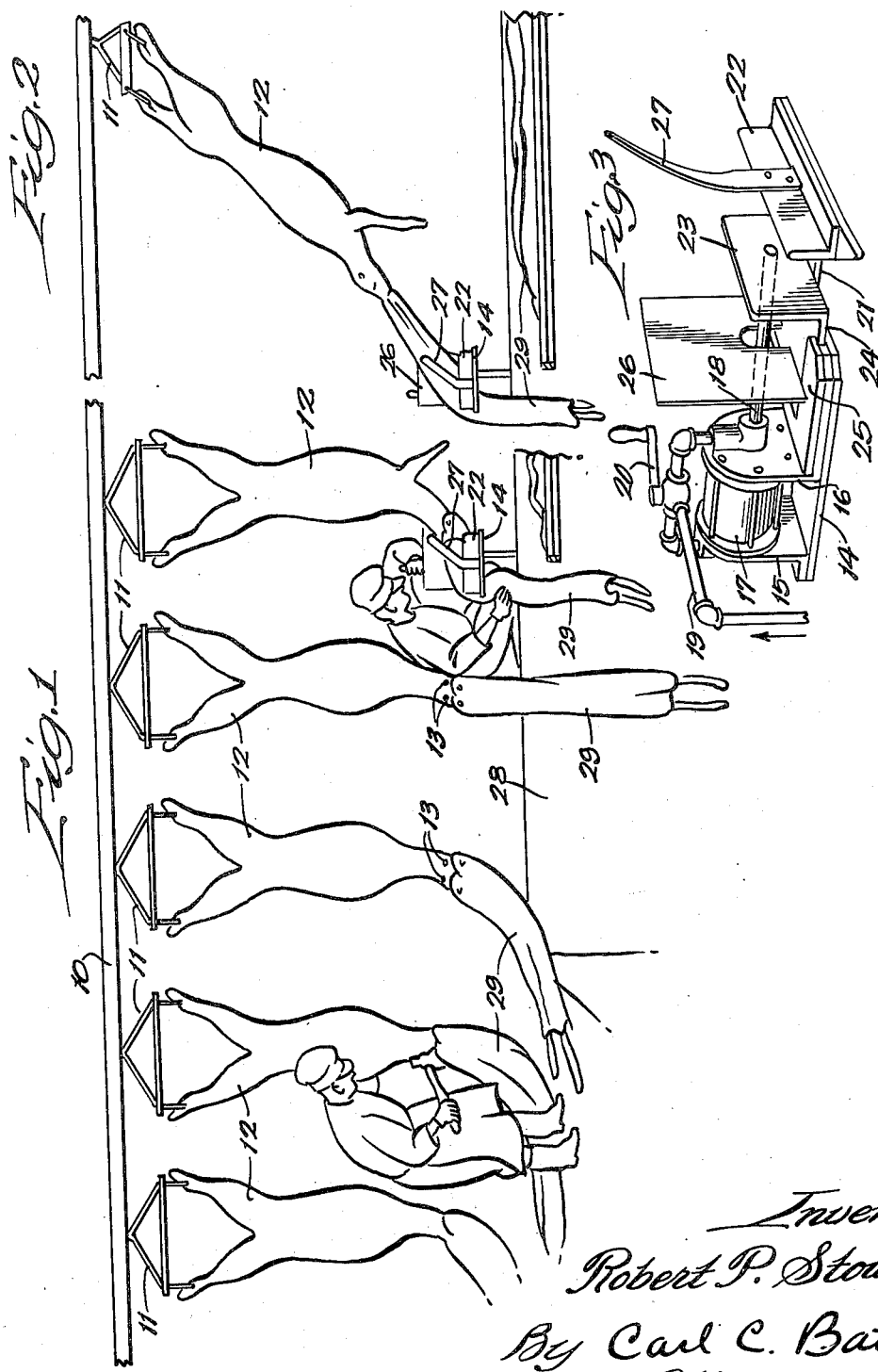
Inventor:
Robert P. Stow,
By Carl C. Batz
Attorney.

Patented Mar. 6, 1951

2,544,437

UNITED STATES PATENT OFFICE 2,544,437

SHEEPSKINNING PROCESS

Robert P. Stow, Downers Grove, Ill., assignor to Armour and Company, Chicago, Ill., a corporation of Illinois Application August 4, 1948, Serial No. 42,423

9 Claims. (Cl. 17—45)

This invention relates to a sheep-skinning process. The invention is particularly useful in the freeing of the pelt from the head of the animal.

In commercial sheep-skinning operations, the greatest difficulty presented is in removing the pelt or skin from the head of the animal. In the skinning operation, it is the practice of the operator to remove the skin from the front of the face by employing a small knife. The knife blade is passed into the corner of the mouth on the left hand side of the sheep and drawn up over the eye to the horn, across the head and then down the other side. The skin is left loose and the skin from the body is then pulled down and the pelt is dropped from the carcass. After that the horns are chopped and the wool or skin left attached to the head is then trimmed off by hand. It is extremely difficult to remove all of the skin or wool and as a result a substantial portion of the heads are condemned by Government inspectors. The manual skinning or scalping of the head is tedious and uncertain. The operation is a bloody and dirty one and results in a contamination of the head and hide. The operations require considerable manual labor and there is a heavy loss by reason of such contamination of the heads.

An object of the present invention is to provide a process by which the skin or pelt is removed in a clean fashion from the head of the sheep so that there is no loss by condemnation. Yet another object is to provide a process for the clean removal of the sheep pelt while reducing the manual operations heretofore required and while removing the skin entirely from the head of the animal. A still further object is to provide a method and means for removing the pelt of a sheep in a modicum of time and while requiring a minimum of manual operations, the pelt-removing process resulting in the removal of all of the hide or skin from the head of the sheep. Other specific objects and advantages will appear as the specification proceeds.

Invention is illustrated, in one embodiment, by the accompanying drawing, in which Figure 1 is a side view in elevation illustrating steps of the process; Fig. 2, the view similar to Fig. 1 but showing a final step in the removal of the pelt; and Fig. 3, an enlarged perspective view of clamp apparatus which may be effectively employed in the process.

In the illustration given 10 designates a rail upon which a chain or other conveyor may be mounted and to which are secured the supports 11. Since the conveyor and supports are of well-known construction, a detailed description is believed unnecessary. It will be understood that the conveyor chain is advanced by power means so as to move the supports 11 in a forward direction, as indicated in Figs. 1 and 2.

The carcass 12 of the sheep is suspended by its hind legs, as indicated in the drawings, and the body pelt is removed by the usual skinning method. The skin is then drawn downwardly so as to expose the top portion of the skull (the horn-bearing portion of the skull). The operator, by means of a hatchet or other means, severs the horns 13 below the skin as illustrated in Fig. 1. Even when the sheep has no horns, it is usually desirable to strike the top portion of the skull to loosen the skin thereon because of the tenacious adherence of the skin to this portion of the animal's head. Further, sheep rub their heads against trees or fences and develop thick callouses between the skin and the skull which unite the skin with great strength to this portion of the skull. After the skin is loosened along the top portion of the skull, as indicated best in Fig. 1, the operator places the body pelt which hangs downwardly from the head of the animal into the jaws of a clamp anchored to a surface and secures the pelt therein. Continued movement of the carcass, as shown best in Fig. 2, draws the pelt from the head of the animal.

Prior to the final operation, as shown in Fig. 2, I prefer to run a knife blade along the under side of the animal's head and about the nose and mouth to loosen the skin thereon and preferably the lower portion of the head is skinned about the lower jaws. In the final step illustrated in Fig. 2, the pelt is then drawn cleanly from the forehead or face of the sheep and no skin or hide is left attached thereto.

Any suitable apparatus for releasably confining the body pelt to an anchor may be employed. In the illustration given, I provide a base plate 14 which may be fixed to a frame mounted upon the floor. Upon the base are mounted the angle plates 15 and 16. Between the plates 15 and 16 is supported a compressed air cylinder 17 provided with a piston 18. The incoming compressed air line 19 has connections leading to each end of the cylinder and a rotary valve is controlled by the handle 20 for diverting compressed air to either end while at the same time permitting the exhaust of air from the end of the cylinder opposite that to which compressed air is being admitted.

Fixed to the base 14 are the extension arms 21 supporting at their ends a fixed jaw 22. A movable jaw 23 is equipped with a horizontal guide 24 extending between the base plate 14 and a guide plate 25 spaced thereabove, as shown more clearly in Fig. 3. If desired, a shield 26 of plastic material, or any suitable material, may be fixed to the upper plate 25 to protect the operator from blood, etc. in the final skinning step. I prefer to equip the fixed jaw 22 with an upwardly extending guide 27 to facilitate the directing of the body pelt into the space between the jaws. The movable jaw 23 is fixed to the end of the piston 18, as shown more clearly in Fig. 3.

Below the conveyor track 10 is a pit or chute 28 into which the body portion 29 of pelt is allowed to hang, as shown more clearly in Fig. 1. Thus, when the suspended pelt 29 reaches the clamp apparatus, the pelt is in alignment with the jaws of the clamp and the pelt is guided almost automatically into the space between the jaws. Handle 20 is then moved to admit compressed air to the inner end of the cylinder 16 and piston 18 carries the movable clamp 23 toward the fixed jaw 22 thus locking the body pelt securely to the anchored clamping means. The remaining operation is automatic, since the conveyor continues to advance and since the body pelt is fixed in position, the portion of the skin upon the head of the sheep is drawn off, as shown in Fig. 2.

If the horns are not chopped off in the step preceding the operation shown in Fig. 2, the hide will not pull cleanly away from the top of the animal's head. It will either tear the hide off about the top of the head or break the sinews in the hind legs by which the animal is secured upon support 11. In prior skin processes, it was impracticable to attempt to cut the horns off since the skin was between the hatchet and the skull. Even if the horns were chopped loose, the operator could not get his knife effectively under the skin about the horns. In the present process, by pulling the body pelt downwardly over the top of the head of the animal, the horns can be readily chopped free and the hatchet or severing instrument does not in this operation pass through the skin.

The operation described above in detail is, in actual practice, carried on with considerable speed and with a minimum of manual operations. The body pelt is dropped to expose the top of the head of the sheep, the loosening of the skin about the top of the head is then effected, the suspended skin is then advanced in line with the jaws of the clamp. The power cylinder quickly secures the pelt. Continued movement of the carcass, as shown in Fig. 2, results in a clean separation of the pelt from the animal's head.

While in the foregoing specification, I have set forth certain of the steps of the operation in considerable detail and have described details of apparatus which may be employed, it will be understood that such details may all be varied widely by those skilled in the art without departing from the spirit of my invention.

I claim:

1. In a sheep-skinning process in which the body portion of the sheep carcass is skinned, the steps of drawing the skin from the body portion downwardly to expose the top portion of the skull but without substantially freeing the skin from the top portion of the skull, chopping the top portion of the skull below the skin to loosen the skin thereon, anchoring the free skin portion, and moving the carcass and free skin portion relatively to each other to separate the skin from the skull.

2. In a sheep-skinning process in which the body portion of the sheep carcass is skinned while suspended by its hind legs, the steps of drawing the skin from the body portion downwardly to expose the horn-bearing portion of the skull but without substantially freeing the skin from the top portion of the skull, chopping the horns below the skin, anchoring the free skin portion, and advancing the suspended carcass to draw the skin from the skull.

3. In a sheep-skinning process in which the body portion of the sheep carcass is skinned while suspended by its hind legs, the steps of loosening the skin about the nose and mouth, drawing the skin from the body portion downwardly to expose the horn-bearing portion of the skull but without substantially freeing the skin from the top portion of the skull, severing the horns below the skin, anchoring the free skin portion, and advancing the suspended carcass to draw the skin from the skull.

4. In a sheep-skinning process in which the body portion of the sheep carcass is skinned while suspended by its hind legs, the steps of skinning the under-jaw portion of the sheep, drawing the skin from the body portion downwardly to expose the top portion of the skull but without substantially freeing the skin from the top portion of the skull, loosening the skin from the top portion of the skull, anchoring the free skin portion, and advancing the suspended carcass to draw the skin from the skull.

5. In a sheep-skinning process in which the body portion of the sheep carcass is skinned while suspended by its hind legs, the steps of drawing the skin from the body portion downwardly to expose the horns of the animal below the skin but without substantially freeing the skin from the top portion of the skull, separating the horn portion below the skin from the skull, anchoring the free skin portion, and advancing the suspended carcass to draw the skin from the skull.

6. In a sheep-skinning process in which the body portion of the sheep carcass is skinned, the steps of drawing the skin from the body portion downwardly to expose the top portion of the skull but without substantially freeing the skin from the top portion of the skull, suspending the carcass by its hind legs, chopping the top portion of the skull below the skin to loosen the skin thereon, clamping the free skin portion to an anchor, and advancing the suspended carcass to draw the skin from the skull.

7. In a sheep-skinning process in which the body portion of the sheep is skinned, the steps of drawing the skin from the body portion partially over the head to expose the top portion of the skull but without substantially freeing the skin from the top portion of the skull, chopping the top portion of the skull to loosen the skin thereon, suspending the carcass by its hind legs and advancing the same, and clamping the free skin portion to an anchor to hold said free skin portion against movement while said carcass is advanced to draw the skin from the skull.

8. In a process for removing the body pelt of a sheep from its head, the steps of clamping the said body pelt to an anchor while the carcass is suspended by its hind legs, drawing the body pelt down to expose the top of the skull, skinning the under side of the jaw, freeing the skin about the nose and mouth, chopping the top portion of the skull to loosen the skin thereon, and advancing the carcass to draw the pelt from the sheep's head.

9. In a process for removing the body pelt from the head of a sheep, the steps of drawing the body pelt downwardly about the head of the sheep to expose the horn-bearing portion of the skull but without substantially freeing the pelt from the horn-bearing portion of the skull, chopping the horn-bearing portion of the skull to free the horns therefrom, clamping the body pelt to an anchor, and advancing the carcass to draw the pelt from the sheep's head.

ROBERT P. STOW.

REFERENCES CITED

The following references are of record in the file of this patent:

UNITED STATES PATENTS

| Number | Name | Date |
| --- | --- | --- |
| 63,910 | Lewis | Apr. 16, 1867 |